United States Patent
Park

(10) Patent No.: US 6,215,259 B1
(45) Date of Patent: Apr. 10, 2001

(54) APPARATUS FOR COMPENSATING FOR CORNER FOCUS AND BRIGHTNESS IN CATHODE RAY TUBE

(75) Inventor: Kwang Ho Park, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/436,629

(22) Filed: Nov. 9, 1999

(30) Foreign Application Priority Data

Nov. 18, 1998 (KR) .................................................. 98-49444

(51) Int. Cl.⁷ ..................................................... H01J 29/58
(52) U.S. Cl. ................ 315/383; 315/368.21; 315/368.18
(58) Field of Search ............................... 315/383, 368.18, 315/382, 1, 368.21, 368.17

(56) References Cited

U.S. PATENT DOCUMENTS

| | | | |
|---|---|---|---|
| 4,633,144 | * 12/1986 | McKibben | 315/382 |
| 5,138,238 | * 8/1992 | Truskalo | 315/368.18 |
| 5,218,275 | * 6/1993 | Truskalo | 315/368.21 |
| 5,519,447 | * 5/1996 | Shima et al. | 348/556 |
| 5,644,196 | * 7/1997 | George | 315/368.18 |

\* cited by examiner

*Primary Examiner*—Don Wong
*Assistant Examiner*—James Clinger
(74) *Attorney, Agent, or Firm*—Fleshner & Kim, LLP

(57) ABSTRACT

An apparatus for compensating for corner focus and brightness in a CRT improves compensation efficiency for corner focus and brightness regardless of the dimensions of the CRT and minimizes the manufacturing cost and power consumption. The apparatus for compensating for corner focus and brightness in a CRT includes a CRT, a parabola signal generator for generating a parabola signal from input vertical and horizontal driving pulses, a fly back transformer for supplying high voltage of parabola waveform to an anode electrode of the CRT, an adder for adding the parabola signal of the parabola signal generator and a feedback voltage from the fly back transformer, an error amplifier for amplifying error components of an output voltage of the adder and a reference voltage, and a +B converter for converting the output of the error amplifier to a direct current voltage level required to operate the fly back transformer.

3 Claims, 3 Drawing Sheets

APPARATUS FOR COMPENSATING FOR CORNER FOCUS AND BRIGHTNESS IN CATHODE RAY TUBE

BACKGROUND OF THE INVENTION

1. Field of the Invention

The present invention relates to a cathode ray tube, and more particularly, to an apparatus for compensating for corner focus and brightness in a cathode ray tube (CRT).

2. Background of the Related Art

Generally, a CRT is an image display device used in a monitor for a computer or a TV. The CRT includes an electron gun for emitting three colored electron beams of red(R)/green(G)/blue(B), a screen for displaying light by colliding the electron beams emitted from the electron gun against a phosphor plane, a shadow mask for dividing the three colored electron beams emitted from the electron gun, and a deflection yoke for deflecting the electron beams emitted from the electron guns into a given place of the screen which acts as an image display plane.

Since the image display plane has a curved surface structure, the range of the electron beams depends on each position. For example, the range of the electron beams in a central portion is different from that in a corner portion. Accordingly, there results in that focus in the corner portion of the image display plane is not correct and brightness is deteriorated. To solve these problems, there has been suggested an apparatus for compensating for focus error in the corner portion and brightness deterioration.

As shown in FIG. 1, a related art apparatus for compensating for corner focus and brightness in a CRT includes a CRT 1, a parabola signal generator 2 for generating a parabola signal by modulating input vertical and horizontal driving pulses, a focus compensator 3 for compensating for corner focus by amplifying the parabola signal input from the parabola signal generator and outputting the amplified signal to a first grid electrode G1 of the CRT 1, and a brightness compensator 4 for compensating for corner brightness by amplifying the parabola signal input from the parabola signal generator 2 and outputting the amplified signal to a fourth grid electrode G4 of the CRT 1, a fly back transformer 5 for supplying high voltage of 24 KV to an anode electrode of the CRT 1, an error amplifier 6 for amplifying errors of an output voltage of the flay back transformer 5 and a reference voltage, and a +B converter 7 for converting the output of the error amplifier 6 to a direct current voltage for operating the fly back transformer 5.

The operation of the aforementioned related art apparatus for compensating for corner focus and brightness in a CRT will be described below.

The parabola signal generator 2 receives vertical and horizontal driving pulses and outputs the parabola signal containing a direct current component and an alternating current component.

Subsequently, the focus compensator 3 amplifies the parabola signal of the parabola signal generator 2 to a voltage level required to compensate for focus and inputs the amplified signal to the fourth grid electrode G4 so that corner focus of the CRT 1 is compensated.

The brightness compensator 4 amplifies the parabola signal of the parabola signal generator 2 to a voltage level required to compensate for brightness and inputs the amplified signal to the first grid electrode G1 so that corner brightness of the CRT 1 is compensated.

Meanwhile, the fly back transformer 5 transforms the direct current voltage from the +B converter 7 and supplies high voltage of 24 KV to an anode electrode of the CRT 1.

At this time, the fly back transformer 5 has an operational frequency characteristic that its high voltage output is not always maintained to be constant, thereby causing errors. Therefore, the error amplifier 6 amplifies errors of a feedback voltage from the fly back transformer 5 and a reference voltage and inputs the resultant value to the +B converter 7.

Then, the +B converter 7 converts the output of the error amplifier 6 to a direct current voltage required to operate the fly back transformer 5 and supplies the converted value to the fly back transformer 5.

Consequently, an image for which focus error and brightness deterioration are compensated by the aforementioned operation is displayed on a screen of the CRT 1.

However, the related art apparatus for compensating for corner focus and brightness in a CRT has several problems.

Since there are provided for separate compensators to compensate for corner focus and brightness, the manufacturing cost and power consumption increase. Furthermore, in case of a large sized CRT, corner focus and brightness are accurately compensated, thereby deteriorating picture quality.

SUMMARY OF THE INVENTION

Accordingly, the present invention is directed to an apparatus for compensating for corner focus and brightness in a CRT, that substantially obviates one or more of the problems due to limitations and disadvantages of the related art.

An object of the present invention is to provide an apparatus for compensating for corner focus and brightness in a CRT, which improves compensation efficiency for corner focus and brightness regardless of the dimensions of the CRT and minimizes the manufacturing cost and power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for compensating for corner focus and brightness in a CRT according to the present invention includes a CRT, a parabola signal generator for generating a parabola signal from input vertical and horizontal driving pulses, a fly back transformer for supplying high voltage of parabola waveform to an anode electrode of the CRT, an adder for adding the parabola signal of the parabola signal generator and a feedback voltage from the fly back transformer, an error amplifier for amplifying error components of an output voltage of the adder and a reference voltage, and a +B converter for converting the output of the error amplifier to a direct current voltage level required to operate the fly back transformer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

An apparatus for compensating for corner focus and brightness in a CRT according to the present invention will be described with reference to FIG. 2.

Figure 1:
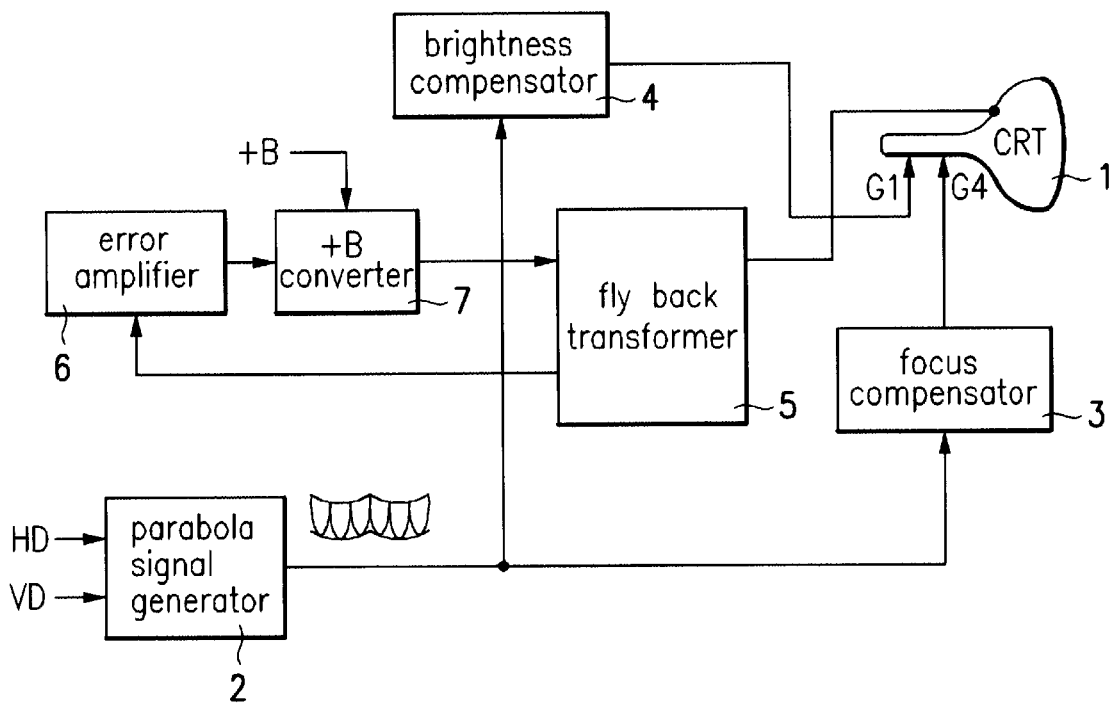
FIG. 1 is a block diagram showing a related art apparatus for compensating for corner focus and brightness in a CRT.
Figure 2:
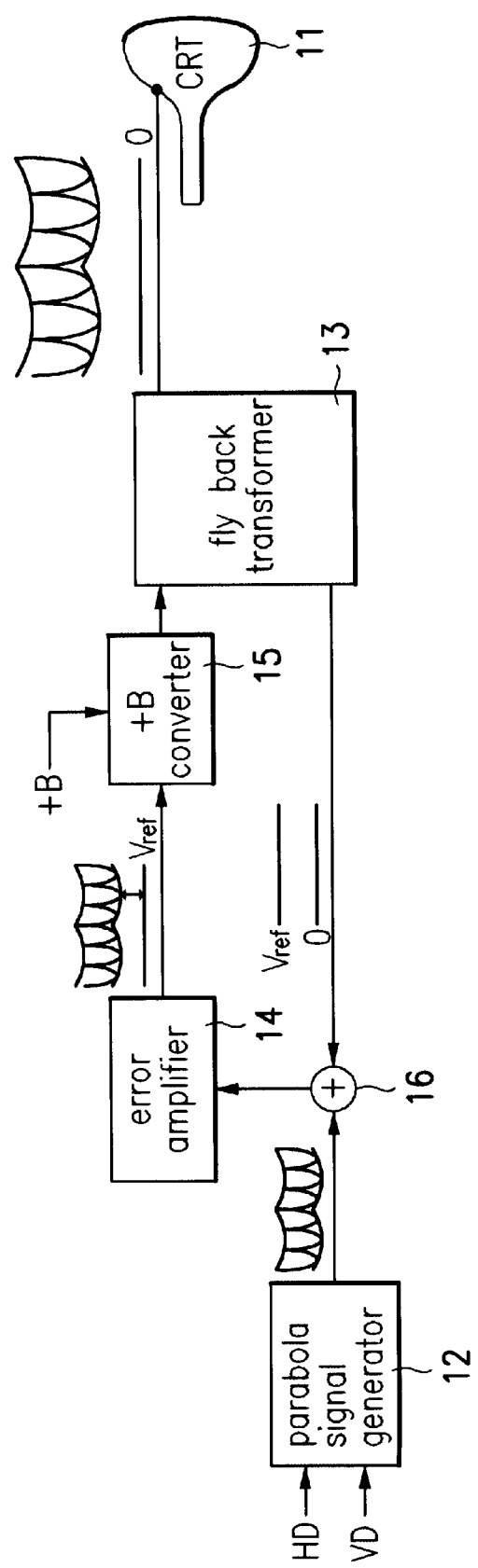
FIG. 2 is a block diagram showing an apparatus for compensating for corner focus and brightness in a CRT according to the present invention.

As shown in FIG. 2, the apparatus for compensating for corner focus and brightness in a CRT according to the present invention includes a CRT 11, a parabola signal generator 12 for generating a parabola signal from input vertical and horizontal driving pulses, a fly back transformer 13 for supplying high voltage of 24 KV to an anode electrode of the CRT 11, an adder 16 for adding the parabola signal of the parabola signal generator 12 and a feedback voltage from the fly back transformer 13, an error amplifier 14 for amplifying errors of an output voltage of the adder 16 and a reference voltage, and a +B converter 15 for converting the output of the error amplifier 14 to a direct current voltage level required to operate the fly back transformer 13.

An output waveform of the parabola signal generator 12 can be modulated to conform to characteristics of a curved surface structure of a screen in the CRT 11. Therefore, the parabola signal generator 12 is adjusted to generate an output waveform suitable for characteristics of the curved surface structure of the screen in the CRT 11 for application in the product.

In other words, the output waveform of the parabola signal generator 12 is generated by mixing different saw-toothed waveforms. Then, another signal waveform is mixed with the resultant signal. Finally, a parabola waveform having a cycle to be applied to a screen area of the CRT and the same structure as the curved surface structure of the screen of the CRT 11 is generated by such mixing processes.

The operation of the aforementioned apparatus for compensating for corner focus and brightness will be described below.

The parabola signal generator 12 receives vertical and horizontal driving pulses and generates the parabola signal containing a direct current component and an alternating current component to output the same to the adder 16.

Subsequently, the fly back transformer 16 makes its output voltage feedback to the adder 16. The adder 16 mixes the parabola signal with the feedback voltage from the fly back transformer 16 and outputs the mixed value to the error amplifier 14.

The error amplifier 14 amplifies error components of the output voltage of the adder 16 and the reference voltage and outputs the resultant value to the +B converter 15.

Then, the +B converter 15 converts the output of the error amplifier 14 to a direct current voltage level required to operate the fly back transformer 13 and outputs the converted value to the fly back transformer 13.

The fly back transformer 13 transforms the output voltage of the +B converter 15 and applies high voltage of 24 KV having the parabola waveform to the anode electrode of the CRT 11.

Figure 3:
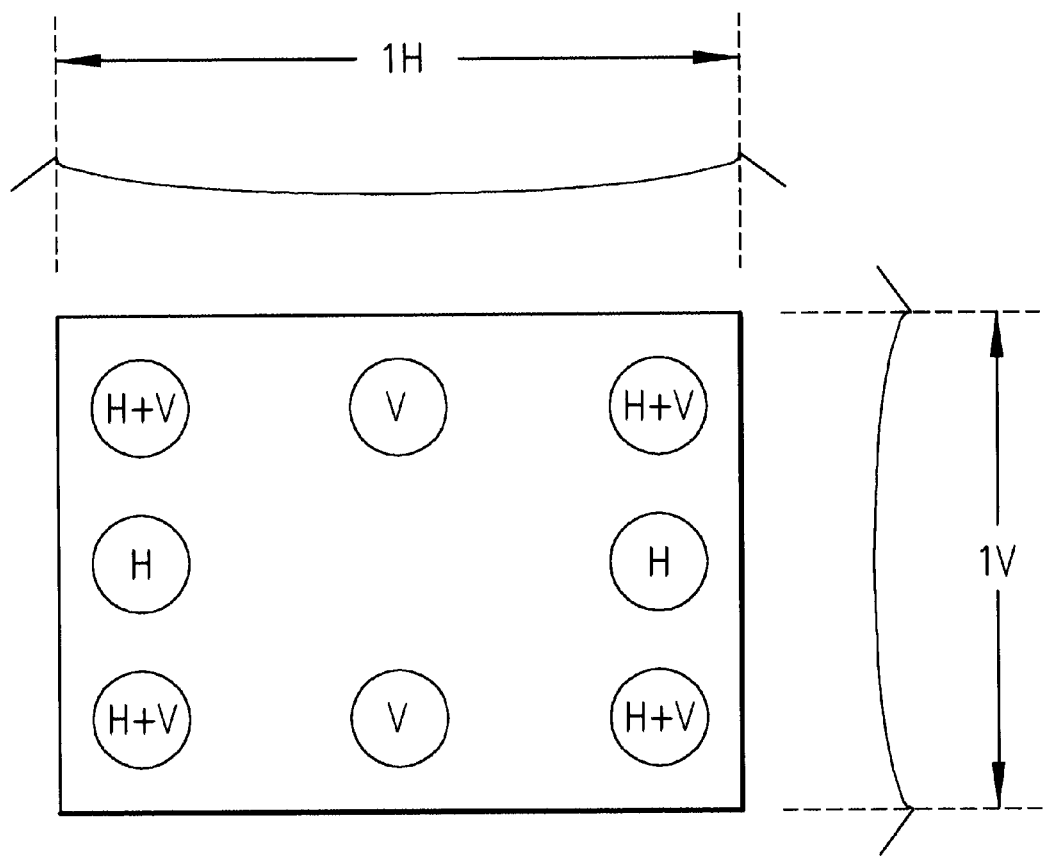
FIG. 3 shows potential distribution on a screen of a CRT according to the present invention.

At this time, the parabola waveform output from the fly back transformer 13 is the same high voltage waveform of 24 KV as the curved surface structure of the screen of the CRT 11 and shows potential distribution as shown in FIG. 3.

In other words, in the potential distribution of FIG. 3, potential of H+V in which a peak of a vertical waveform overlaps with a peak of a horizontal waveform is applied to each corner of the screen, and either potential of H or potential of V is applied to other portions. This potential distribution compensates for focus error and brightness deterioration in the corner portion, so that uniform focusing and uniform brightness level can be achieved over the entire screen. Accordingly, it is possible to obtain uniform brightness and focus characteristics over the entire screen without separate brightness and focus compensators unlike the related art.

As aforementioned, the apparatus for compensating for corner focus and brightness in a CRT has the following advantages.

Since it is possible to obtain uniform brightness and focus characteristics over the entire screen without separate brightness and focus compensators, power consumption and the manufacturing costs can be minimized. In addition, the parabola waveform of high voltage which is the same as the curved surface structure of the screen in the CRT is directly applied to the anode electrode of the CRT to precisely distribute vertical and horizontal potentials on the entire surface. This improves picture quality.

It will be apparent to those skilled in the art that various modifications and variations can be made in the apparatus for compensating for corner focus and brightness in a CRT according to the present invention without departing from the spirit or scope of the invention. Thus, it is intended that the present invention covers the modifications and variations of the invention provided they come within the scope of the appended claims and their equivalents.

What is claimed is:

1. An apparatus for compensating for corner focus and brightness in a CRT comprising:

a parabola signal generator for generating a parabola signal from input vertical and horizontal driving pulses;

a fly back transformer for supplying high voltage of parabola waveform to an anode electrode of the CRT;

an adder for adding the parabola signal of the parabola signal generator and a feedback voltage from the fly back transformer;

an error amplifier for amplifying error components of an output voltage of the adder and a reference voltage; and a +B converter for converting the output of the error amplifier to a direct current voltage level required to operate the fly back transformer.

2. The apparatus for compensating for corner focus and brightness in a CRT as claimed in claim 1, wherein the parabola signal generator generates a parabola signal of a curved line waveform corresponding to a curved surface of a screen in the CRT.

3. The apparatus for compensating for corner focus and brightness in a CRT as claimed in claim 1, wherein an output waveform of the parabola signal generator can be modulated.

* * * * *